B. KOTKOVSKY.
BUTTON FEEDING MECHANISM.
APPLICATION FILED JUNE 10, 1915.
1,181,230.
Patented May 2, 1916.
6 SHEETS—SHEET 4.
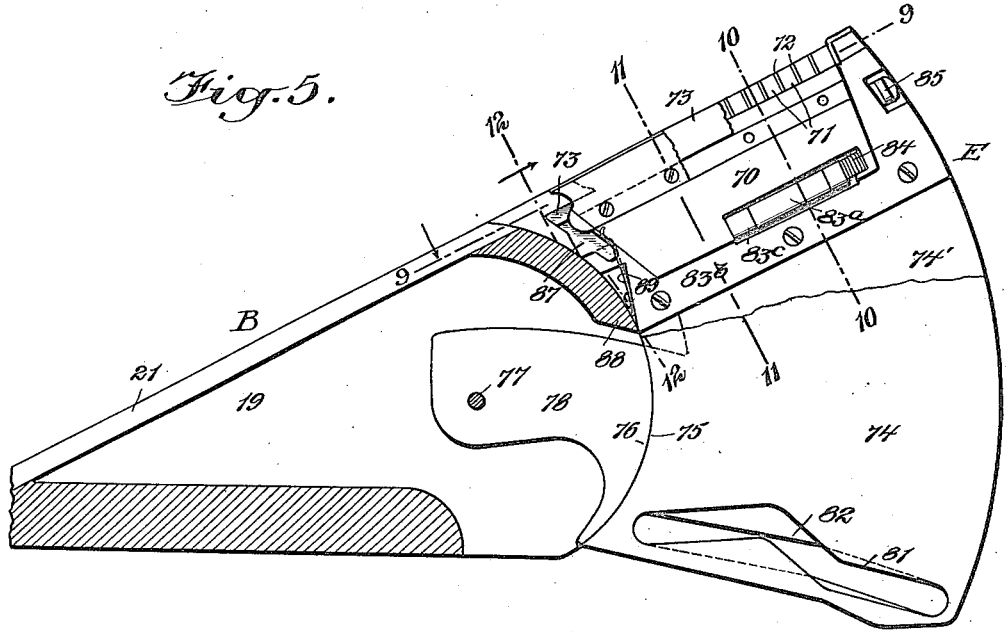
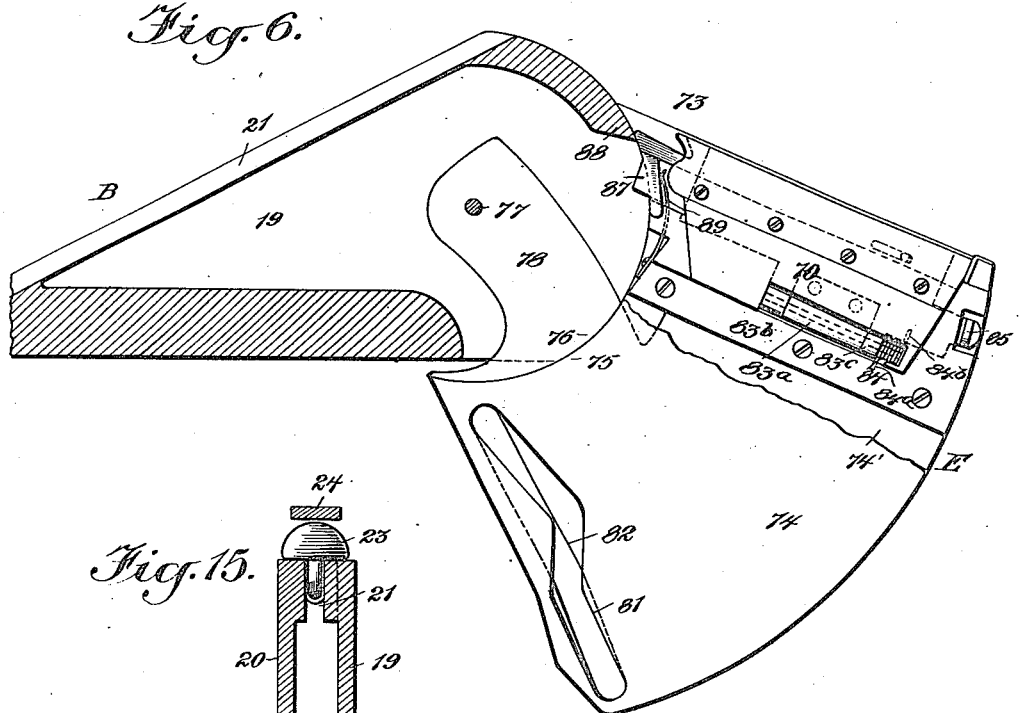
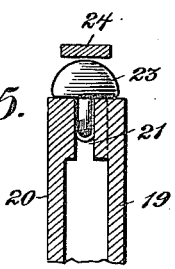
WITNESSES
INVENTOR
B. KOTKOVSKY
BY
ATTORNEYS

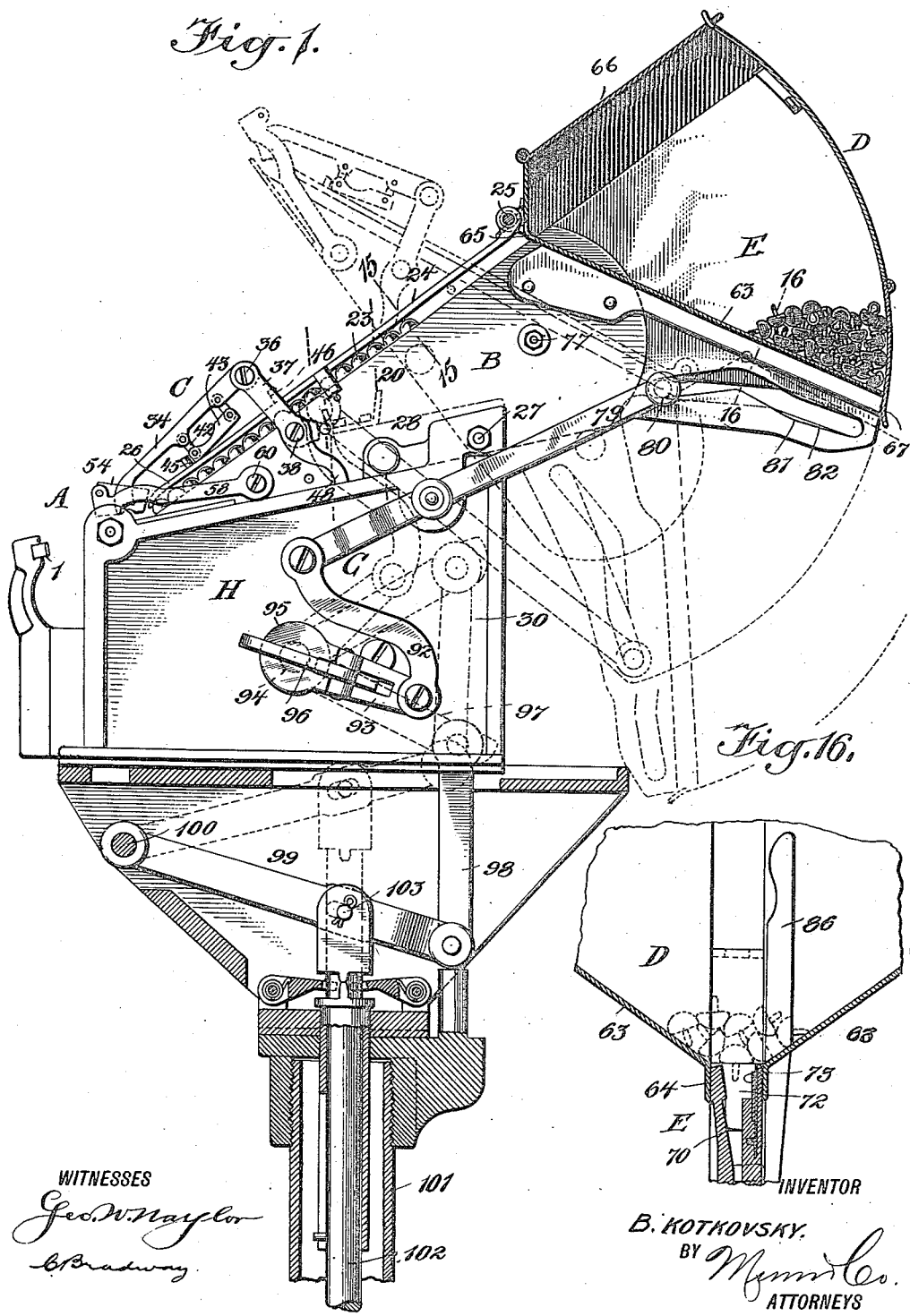

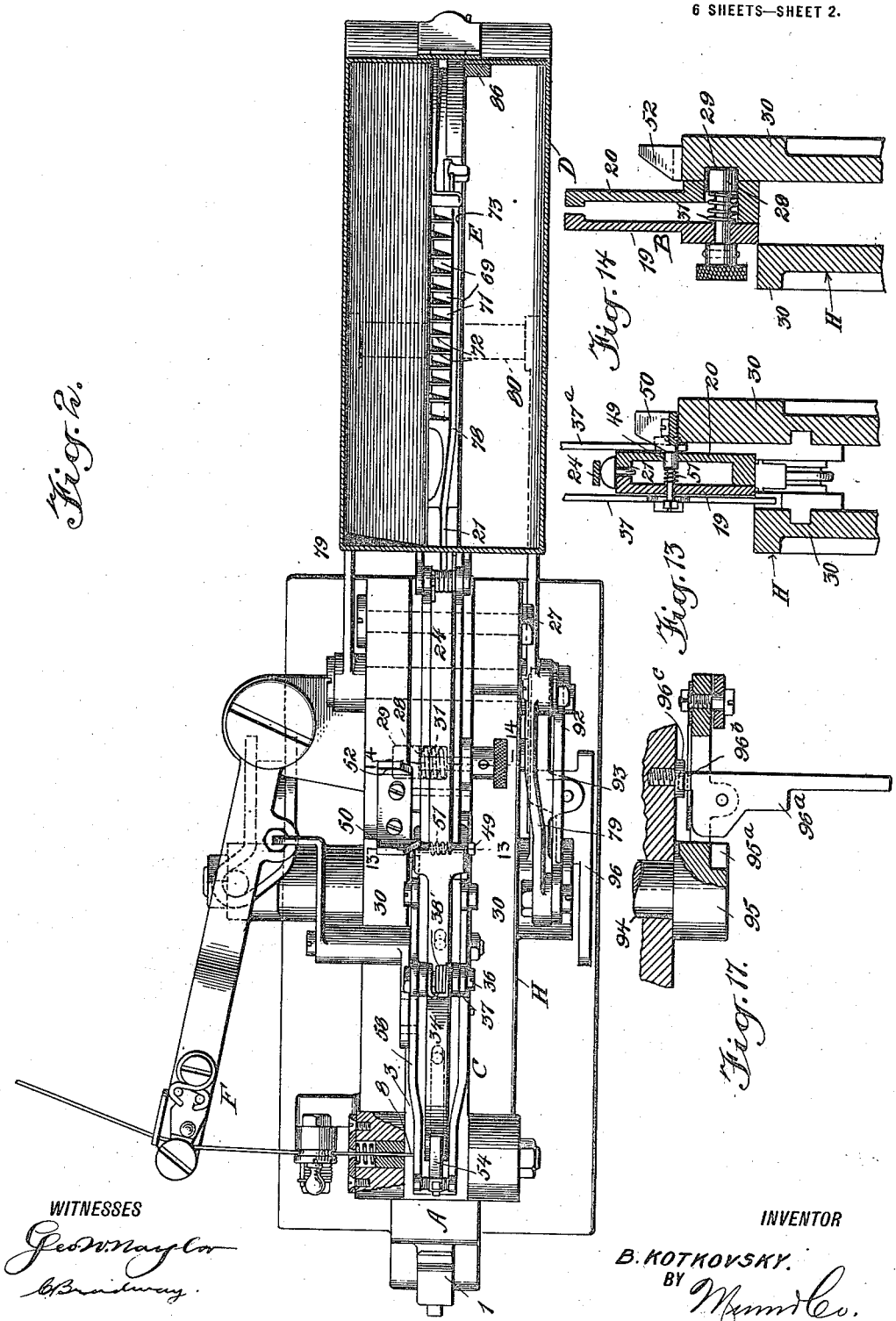

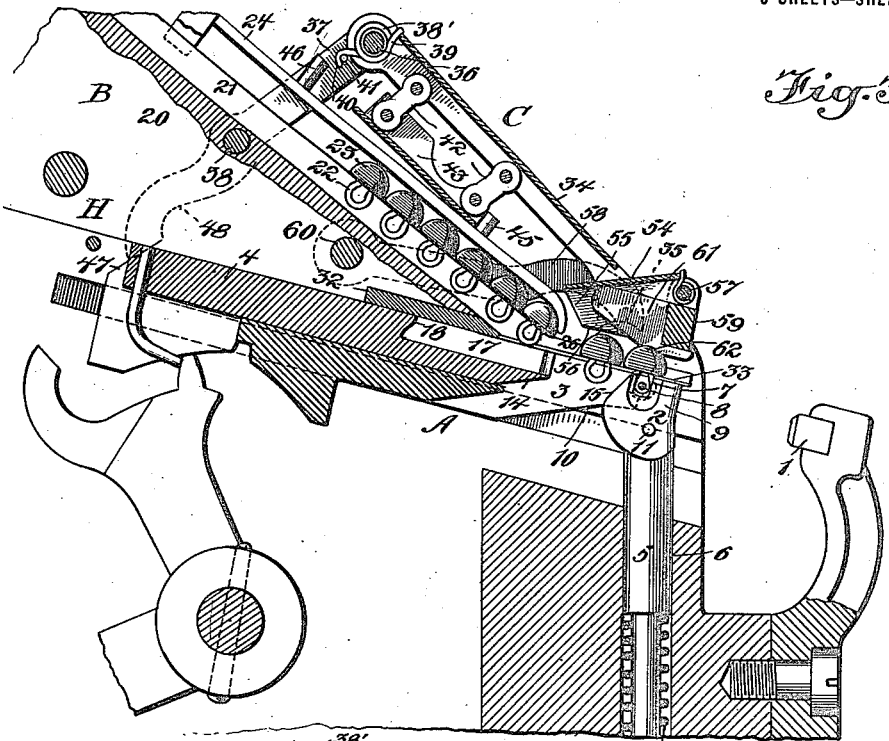
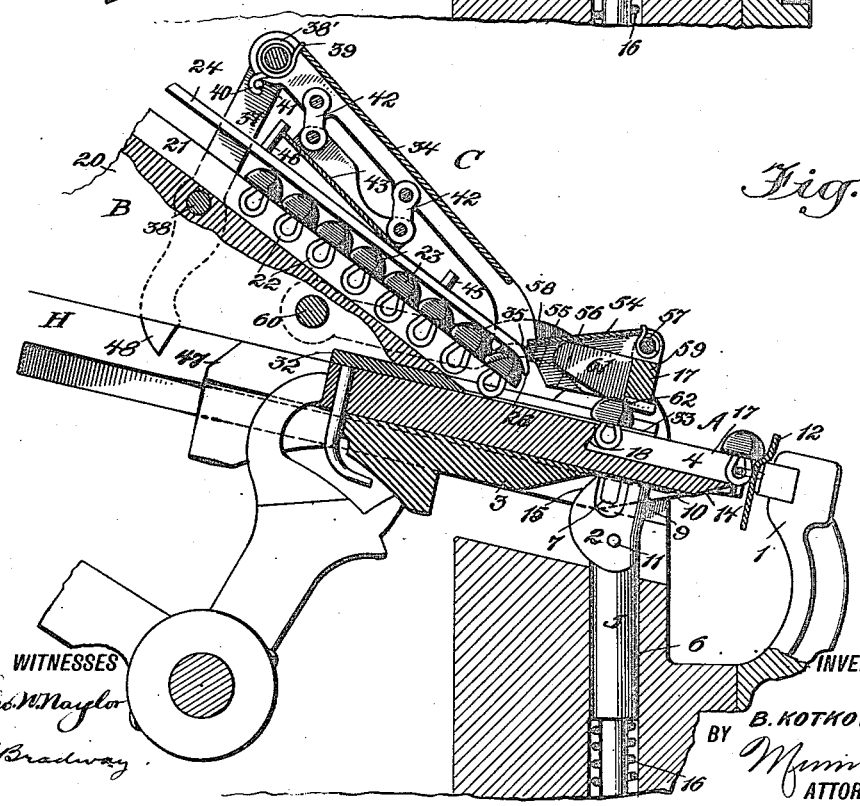

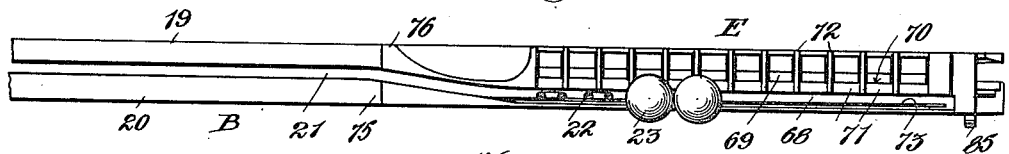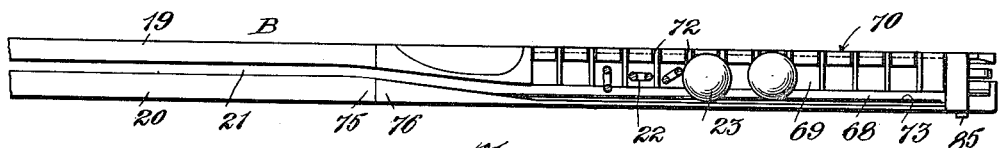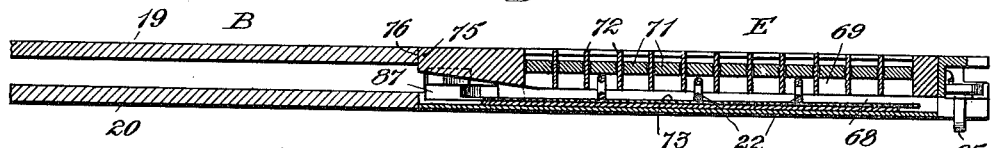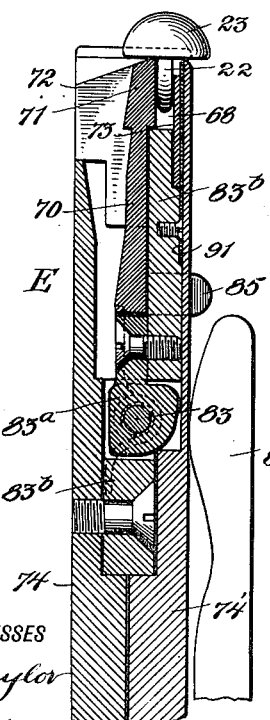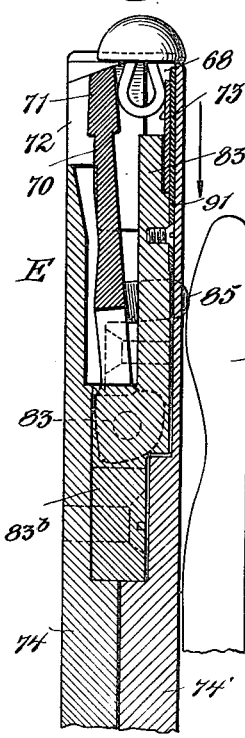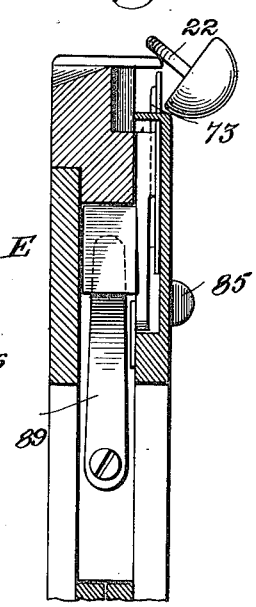

B. KOTKOVSKY.
BUTTON FEEDING MECHANISM.
APPLICATION FILED JUNE 10, 1915.

1,181,230.

Patented May 2, 1916.
6 SHEETS—SHEET 6.

WITNESSES
Geo. W. Naylor
C. Bradway

INVENTOR
B. KOTKOVSKY.
BY
ATTORNEYS

UNITED STATES PATENT OFFICE.

BENJAMIN KOTKOVSKY, OF NEW YORK, N. Y., ASSIGNOR TO RAPID BUTTON ATTACHING MACHINE CO., OF NEW YORK, N. Y., A CORPORATION OF NEW YORK.

BUTTON-FEEDING MECHANISM.

1,181,230.     Specification of Letters Patent.     Patented May 2, 1916.

Application filed June 10, 1915. Serial No. 33,299.

*To all whom it may concern:*

Be it known that I, BENJAMIN KOTKOVSKY, a subject of the Czar of Russia, and a resident of the city of New York, borough of Brooklyn, in the county of Kings and State of New York, have invented a new and Improved Button-Feeding Mechanism, of which the following is a full, clear, and exact description.

This invention relates to a feeding mechanism for feeding shoe buttons and the like to an attaching mechanism, such as a staple forming and driving device, and the invention relates more particularly to a button feeding mechanism of the type disclosed in Letters Patent, Number 1,145,774, granted July 6, 1915.

The invention has for its general objects to improve the construction and operation of apparatus of the character referred to so as to be reliable and easy to operate, comparatively simple to manufacture and keep in operative condition, and so designed that it will operate with buttons of various sizes.

A more specific object of the invention is the provision of simple, novel and effective means for picking up buttons in a hopper, arranging them in a predetermined order, and supplying them in such order to a button-feeding chute.

Another object of the invention is to provide a reliable device for intermittently feeding a button from the chute to the button attaching mechanism of the machine.

With such objects in view, and others which will appear as the description proceeds, the invention comprises various novel features of construction and arrangement of parts which will be set forth with particularity in the following description and claims appended hereto.

Figure 18:
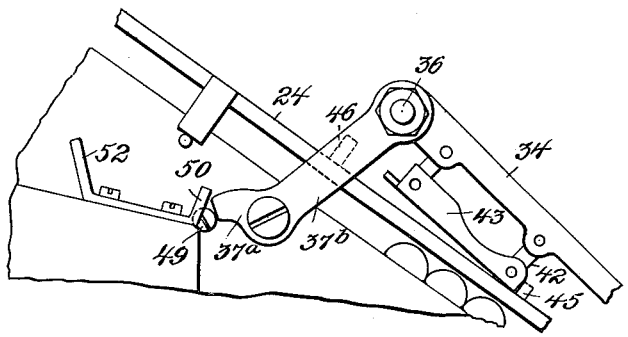
Figure 19:
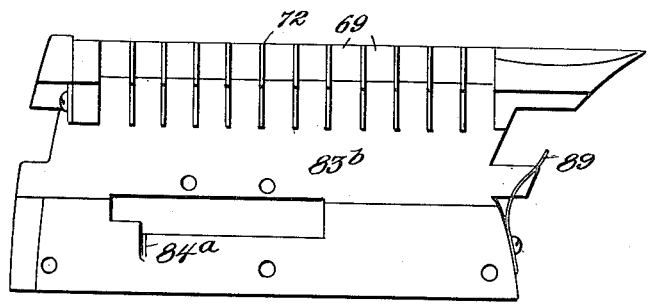
Figure 20:
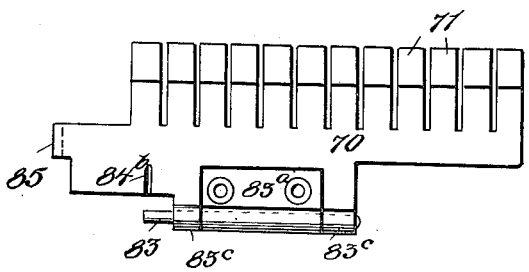

In the accompanying drawings, which illustrate one embodiment of the invention, and wherein similar characters of reference indicate corresponding parts in all the views, Figure 1 is a side view of a button-attaching machine having the improved button-feeding mechanism applied thereto, parts of the machine being shown in section; Fig. 2 is a horizontal section of the machine with the hopper in section; Fig. 3 is an enlarged view of the button-feeding device for feeding buttons from the chute to the staple-forming and driving mechanism; Fig. 4 is a similar view showing the parts in a different position; Fig. 5 is a detail view of the pick-up device and button chute partially in section; Fig. 6 is a similar view with the pick-up device in its lowermost position for picking up buttons; Fig. 7 is a plan view of the pick-up device and chute with buttons in position to pass from the device into the chute; Fig. 8 is a similar view with several buttons caught in the pick-up device but caught prior to being alined for feeding into the chute; Fig. 9 is an enlarged sectional view on the line 9—9, Fig. 5; Figs. 10, 11 and 12 are transverse sectional views respectively on the lines 10—10, 11—11 and 12—12, Fig. 5; Figs. 13 and 14 are detail sectional views on the lines 13—13 and 14—14 respectively, Fig. 2; Figs. 15 and 16 are detail sectional views on the lines 15—15 and 16—16 respectively, Fig. 1, the button pick-up device being lowered in the Fig. 16; Fig. 17 is a detail view of the clutch device for connecting the button pick-up means with the actuating mechanism; Fig. 18 is a detail view of the means for holding the button feeder set while the chute is being lowered from raised position; Fig. 19 is a detail view of a part of the button pick-up device; and Fig. 20 is a detail view of another part of the button pick-up device.

Referring to the drawings, A designates a button-attaching mechanism; B a button supply chute; C a device for feeding buttons from the chute to the attaching mechanism; D a button hopper; E a button pick-up device in the hopper; F a wire-feeding mechanism and G actuating means for the button pick-up device.

The button-attaching mechanism A constitutes the subject matter of a co-pending application, Serial Number 33,298, filed June 10, 1915, so that the description thereof will be only general. This mechanism comprises a suitably arranged anvil 1, a staple-forming die 2, a staple former 3, and a staple driver 4. The anvil is stationary and the former 3 and driver 4, which are nested together, reciprocate toward and from the anvil. The die 2 is vertically slidable by the shank 5 thereof being disposed in a vertical opening 6, and this die has a transverse opening or recess 7 in its top to receive the wire 8 from which a staple is formed, the wire being bent around the portion 9 of the die 2. The staple-forming portion of the die 9 is normally disposed in the plane of the staple former 3, so that the latter in moving forwardly first cuts the wire and then bends the cut portion or blank of the wire around the part 9 of the die, this forming of the staple taking place after a button is fed to the die, and occupies the position shown in Fig. 3. After the staple is formed the continued forward movement of the former 3 causes the beveled surface 10 thereof to strike an abutment 11 on the die to force the latter downwardly, and thereafter the staple driver 4 comes into action and by moving forwardly it carries the button and staple toward the anvil, forcing the staple through the article 12, so that the button will be attached to the latter, as shown in Fig. 4. The beveled surface 14 on the forward end of the staple driver strikes the rear portion 15 of the die and forces the latter another step downwardly so as to be out of the way of the driver, which moves over the top of the die and holds the same depressed, as shown in Fig. 4. When the staple driver and former return to normal position the die is raised by means of a spring 16. The means for operating the staple former and driver need not be described, it being understood that the former operates first; then the driver comes into play to drive the staple. The staple driver has a longitudinal slot 17 for receiving the shank of a button, the end 18 of the slot forming an abutment which engages a button shank and moves a button to staple-receiving position while a button having a staple applied thereto is being driven and clenched, that is to say, when the staple driver moves forwardly the second button from the right in Fig. 3 is carried forwardly to staple-receiving position shown in Fig. 4, while the driver is attaching a button to the article 12.

The chute B is composed of a pair of plates 19 and 20 which are spaced apart so that their top edges, which are inclined to an angle of forty-degrees more or less, will form a groove 21 to receive the shanks 22 of the buttons, the heads 23 of the buttons resting on the top edges of the plates 19 and 20. These plates are carried by the frame H of the machine. To prevent the buttons from dropping out of the chute there is arranged over the guide groove 21 thereof, a guard bar 24 which is pivotally connected at its upper end 25 with the front part of the hopper D, and the lower extremity 26 of this bar is bent downwardly to form a gate which engages the lowermost button in the chute to prevent the latter from discharging therefrom, but when the lowermost button is forced by the button-feeding device C out of the chute, the guard bar is forced upwardly by the cam action of the button head on the curved gate-forming tip 26, and as soon as the button is discharged the gate will immediately close by the weight of the bar, thereby preventing the buttons from running out of the chute. The chute B is pivotally mounted so that the button run portion thereof can be tilted from an angle below a horizontal to an angle above a horizontal, whereby the buttons can be discharged back into the hopper D, as when buttons of a different type or size from those in the machine are to be used. For this purpose the chute B is mounted to swing on a horizontal pivot 27 which is mounted in the upper rear corner of the frame H, Fig. 1, and a spring-actuated catch bolt 28 is carried by the chute and engages in an opening or equivalent means 29 in one of the plates 30 that form the sides of the frame H, as shown in Fig. 14. By pulling outwardly on this bolt in opposition to the spring 31, the chute B can be tilted so that the lower end thereof will be thrown upwardly far enough to cause the buttons to run back into the hopper which is carried by the chute. On the lower part of the chute is fastened a plate 32 on which the buttons rest after leaving the chute and entering the button-attaching mechanism A, this plate having a longitudinal slot 33, Figs. 3 and 4, to permit the shanks of the buttons to pass into operative relation with the staple-forming die. The staple former and driver are in contact with the under side of this plate 32.

The feeding device C comprises a longitudinally movable feeder 34 which is disposed over the lower end of the guard bar 24, and the lower extremity of this feeder 34 has a recess 35 shaped to engage the head of a button which is in the lower extremity of the chute. The feeder 34 is connected by a horizontal pivot 36 with a lever 37 that is fulcrumed at 38 on the chute B, there being on the pivot a spring 38' which has an end 39 engaging the upper extremity of the feeder 34 and an end 40 engaging a pin or equivalent means 41 on the lever, the said spring serving to draw the lever 37 and button feeder 34 together like the spring of a pocket knife acting on the handle and an open blade. On the button feeder 34 is suspended by parallel links 42, a shoe 43 which slides on the upper surface of the button guard 24, such shoe and links forming a throw-out or lifting means whereby the feeder will be elevated on its return stroke so as to clear the next button after having fed forwardly the lowermost button in the chute. This shoe 43 is in the position shown in Fig. 4 during the time the feeder 34 feeds a button forwardly, and during the last part of this movement the lower end of the shoe strikes a stop 45 on the guard 24, whereby the shoe is arrested while the feeder continues to move, and in so doing the feeder is elevated, as shown in Fig. 3. The links 42 are approximately on a dead center line and are maintained in this position during the upward movement of the feeder, until the upper end of the shoe strikes a fixed stop 46 on the guard 24, the effect of this being that the parts are shifted to the position shown in Fig. 4, with the lower end of the feeder engaging the button in the lower end of the chute. The upward movement of the feeder is effected by the spring 38', whereas the downward movement is caused by the return stroke of the staple former 3, since the rear end 47 of the latter strikes the lower end 48 of the lever 37. The return or upward movement of the feeder 34 occurs as the staple former 3 moves forwardly. Since the movable parts of the machine are normally in the position shown in Fig. 3, it will be apparent that when the chute is tilted upwardly the feeder 34 and lever 37 will, by reason of the spring 38', assume the relative position shown in Fig. 4, whereby the lower end 48 of the lever 37 would strike the staple former when the chute is restored to normal position, and to avoid this the lever 37 must be thrown to and held in the position shown in Fig. 3. The catch 49 for this purpose, is, as shown in Figs. 13 and 18, mounted in the chute and one end is adapted to project out of the side of the chute so as to engage a projection 37ª on a link 37ᵇ which is pivotally connected with the feeder 34, as shown, whereby the lever 37 in Fig. 18 can be held backwardly to enable it to engage the rear end of the staple former when the chute is lowered and locked in normal position, but when this occurs the catch pin 49 is automatically retracted and lies flush with the side of the chute so as not to interfere with the swing of the member 37ᵇ during the operation of the feeder 34. The retracting of the lock pin 49 is effected by a cam or beveled abutment 50, Figs. 2 and 13, and as soon as the catch passes above the abutment the spring 51 for the catch projects the latter so as to prevent movement of the feeder. Adjacent the cam 50 is another cam 52, Figs. 2 and 14, against which the bolt 28 is adapted to strike to force the bolt to position for clearing the adjacent plate 30 when the chute is returned to normal position after having been tilted to empty it of buttons, and when the chute is in proper position the bolt 28 snaps into engagement with the socket 29.

A guiding device 54 is employed at the lower end of the chute to guide buttons therefrom to the attaching mechanism. This guide has a beveled surface 55 against which the button strikes after leaving the chute, and the guide yields upwardly so that the end of the button can pass under and slide along the bottom 56 of the guide, whereby the buttons will be kept properly in place while being transferred to the attaching mechanism. The guide 54 yields upwardly so as to accommodate buttons with heads of different sizes. The guide is mounted on a pivot 57 which is carried by an open rectangular frame comprising parallel side bars 58 and a front connecting bar 59, the bars 58 being disposed at opposite sides of the lower end of the chute B, and connected therewith by a pivot 60, whereby the front end of the frame can be raised slightly by the cam action of a button wiping under the bottom surface of a tongue 61 carried by the front bar 59, said tongue having a recess 62 arranged at a point directly over the staple-forming die 2, so as to permit the head of a button to be engaged in the recess and thereby be held steady in staple-receiving position, as shown in Figs. 3 and 4. The frame that carries the guide 54 is adapted to tilt upwardly so as to operatively connect the wire-feeding device F with the operating mechanism of the machine, whereby wire will feed only when there is a button in staple-receiving position, but the means for accomplishing this result need not be described, since it is presented in a co-pending application hereinbefore referred to.

The hopper D is of any suitable box-like construction and has its bottom formed of oppositely sloping portions 63 which are at opposite sides of a slot 64 in which the pick-up device E oscillates in a vertical plane. The hopper, which is fastened to the upper end of the chute B has in its front wall an opening 65 out of which the buttons pass in sliding down the chute B, the top of the hopper being open and provided with a suitable door 66, and the rear of the hopper is open adjacent the bottom so that the hopper can be emptied of buttons, but this opening is normally closed by a door 67. When the chute B tilts from its normal position it carries the hopper with it.

The pick-up device E oscillates so that the pick-up portion thereof will move to and from the bottom of the hopper for picking up buttons that are held approximately in the hopper. This pick-up device E has at its top a channel or groove 68, Figs. 2 and 7 to 11 inclusive, which channel communicates with the groove or channel 21 of the chute B, so that buttons can slide out of the pick-up device into the chute. To facilitate the picking up of buttons the top edge of the pick-up device in which the groove 68 is arranged is provided wih a plurality of pockets 69 arranged in a line so that the eyes or shanks 22 of the buttons can enter these pockets, and as the pockets communicate with the channel or groove 68 it is merely necessary to provide some laterally moving displacing device for throwing the shanks of the buttons out of the pockets into the channel. This displacer 70 is in the form of a plate having teeth 71 which extend between the partitions 72 that separate adjacent pockets, and by these teeth moving from the position shown in Fig. 8 to that shown in Fig. 7 the button shanks are shifted into the channel 68. It is likely that the shank 22 of one or more buttons may occupy a dead center position, as shown in Fig. 9, and for this purpose the wall of the channel 68 is formed by a longitudinally movable strip 73 which has a rolling action on the eyes 22 of the buttons so as to cause the latter to aline and permit the displacer 70 to complete its function of throwing the shanks of all the picked up buttons into the channel 68, whereby the buttons will run by gravity into the chute B. The pick-up device is shown in the present instance as formed of two parallel plates 74 and 74' in the form of segments of a ring, the inner circular edges 75 of the plates fitting a circular surface 76 of the chute such surface being concentric with a pivot 77 in the chute which pivotally connects the pick-up device with the latter. The plates 74 and 74' have tongues or extensions 78 which extend into the chute and through which the pivot 77 passes. The pick-up device has an oscillatory movement around the pivot 77 which is performed by means of an operating lever 79 which is provided with a pin 80 that extends into slots 81 and 82 in the plates 74 and 74', respectively. These slots are dissimilar in shape so that the plates 74 and 74' have relative movement, whereby those buttons which happen to be picked up by the pick-up device but do not rest with their eyes in the pockets 69, will be caused to drop off. It will be understood that the pick-up device is moved by the lever 79 downwardly to a point where the button-receiving pockets 69 will be under the mass of buttons in the hopper, and on the upward movement of the pick-up device will pass through this mass of buttons, and in so doing pick up one or more which happen to have their eyes or shanks engaged in a pocket 69. The upward movement of the pick-up device stops when the upper edge thereof is in alinement with the chute B down which the buttons feed. The displacer 70 is mounted to swing on a pivot 83, Figs. 5 and 10, and a spring 84 acts on the displacer to urge it from the position shown in Fig. 11 to that shown in Fig. 10. The pivot 83 extends through a block 83ª, Figs. 10 and 20, fastened to a plate 83ᵇ which is in turn fastened to the plate 74, and located between the plates 74 and 74', and the pivot 83 also extends through lugs 83ᶜ on the displacer 70. One end of the helical spring 84 on the pivot bears at 84ª on the plate 83ᵇ and the other end bears at 84ᵇ on the displacer 70, Figs. 6, 19 and 20. On the displacer is a projection 85 which moves along a cam bar 86 which is fastened in the hopper, this cam bar having a surface so formed as to cause the displacer to swing to open position when the pick-up device is at or near the bottom of the hopper, whereby the eyes of the buttons can enter the pockets 69, but when the projection is clear of the cam bar the spring 84 will move the displacer for throwing the eyes of the buttons into the channel 68, and those eyes which tend to prevent this movement of the displacer, as in Fig. 9, will be turned by the sliding strip 73 moving longitudinally. The movement of this strip is effected by a projection or cam 87 on the forward end thereof which is adapted to engage an abutment 88, Figs. 5 and 6, when the pick-up device moves upwardly. The spring 89 acts on this tripping strip 73 to move it in the opposite direction, that is to say, from the position shown in Fig. 5 to that shown in Fig. 6. As shown in Figs. 10 and 11, this tripping element 73 is slidable on the plate 83ᵇ which carries a thin strip 91 between which and the plate 83ᵇ the tripping element 73 is arranged. The plates 74 and 74' are cut out to form a chamber in which the displacing device 70, tripping element 73 and the support therefor 91, are housed.

The pick-up device E receives motion from the lever 79 that is connected by a link 92 with an operating crank arm 93. This crank is loose on a shaft 94 which carries a hub 95 that is adapted to engage a clutch element 96 pivoted on the arm 93. By throwing out the clutch element 90 the crank arm 93 will not oscillate with the rotation of the shaft 94, whereby the pick-up device will remain stationary while the machine is being used for attaching buttons that may be fed to the chute by hand. When the buttons are being supplied to the chute from the hopper by the pick-up device the clutch element 96 is engaged with the hub 95 by the corner 96ª entering a slot 95ª in the hub 95, so that the parts swing from the full to dotted-line position, and vice versa, Fig. 1, there being an oscillation of the pick-up device which each operation of forming, driving and clenching a staple, but if the chute is filled, the buttons picked up by the pick-up device will simply move up and down with the pick-up device without clogging the same. When the pick-up device E is not oscillating, as when it is used for feeding buttons by hand, the clutch lever 96 will be in the position shown in Fig. 17, where the projection 96ᵇ on the lever 96 engages under a stop 96ᶜ on the machine frame so that the pick-up device E will be sustained with its top in alinement with the chute B. The shaft 94, which actuates the pick-up device, is operated in any suitable manner, as, for instance, by an arm 97 connected by a link 98 with a lever 99, which lever is fulcrumed at 100 in the table or head portion of the machine, such head portion being fastened to the top of a column 101 which is attached to a foot-piece (not shown). In this column is a reciprocatory pedal-operated rod 102 that is connected at 103 with the link 99. Although the pick-up device E is shown as made up of two relatively movable plates 74 and 74', this is not essential, as the plates may be relatively fixed.

From the foregoing description taken in connection with the accompanying drawings, the advantages of the construction and method of operation will be readily understood by those skilled in the art to which the invention appertains, and while I have described the principle of operation, together with the apparatus which I now consider to be the best embodiment thereof, I desire to have it understood that the apparatus shown is merely illustrative and that such changes may be made when desired as fall within the scope of the appended claims.

Having thus described my invention, I claim as new and desire to secure by Letters Patent:

1. A button feeding mechanism comprising a chute having a groove in which the shanks of the buttons slide, a guide bar disposed over the groove to prevent the buttons from running out of the chute, the lower end of the bar yielding upwardly to permit buttons to pass out of the chute, a reciprocatory feeder for engaging the lowermost button and forcing the same out of the chute, and means suspended by the feeder and engaging the bar to cause the feeder to be raised during its return movement and to be lowered during its forward movement.

2. A button feeding mechanism comprising a chute, a gate device engaging the lowermost button of the chute, a reciprocatory feeder disposed over the gate device for engaging the lowermost button and discharging the same from the chute, means for reciprocating the feeder, a device carried by and suspended from the feeder and sliding back and forth on the gate device, and means acting on the device to cause the latter to raise the feeder on its return stroke and to lower the same preparatory to the forward stroke.

3. A button feeding mechanism comprising a chute, a gate means for engaging the lowermost button, a reciprocating feeder disposed over the discharge end of the chute and adapted to engage the lowermost button, a lever for actuating the feeder, an elevating device carried by the feeder, and spaced stop means with which the device engages for raising the feeder at the end of its discharge stroke and lowering the feeder at the end of its return stroke to engage the succeeding button.

4. A button feeding mechanism comprising means for holding a line of buttons tending to descend, a feeder disposed over the buttons and having a lower end adapted to engage the lowermost button for discharging the same, an element for reciprocating the feeder, and means suspended from the feeder and acting on the latter to hold the same elevated during the return stroke to clear the lowermost button and permitting the feeder to descend into engagement with such button prior to the next discharge stroke.

5. A button feeding mechanism comprising means for holding a line of buttons tending to descend, a feeder disposed over the buttons and having a lower end adapted to engage the lowermost button for discharging the same, an element for reciprocating the feeder, a shoe linked to and suspended from the feeder, a surface along which the shoe travels, and means for automatically shifting the shoe to hold the feeder raised during the return stroke, and to permit the feeder to descend at the end of the return stroke into engagement with the lowermost button.

6. A button feeding mechanism comprising means down which a plurality of buttons can flow, a reciprocatory feeder arranged to engage and discharge the lowermost button, an actuating lever to which the feeder is connected, a spring acting between the lever and feeder for effecting the return stroke of the feeder and urging the same toward the buttons, a shoe disposed under the feeder, links connecting the shoe with the feeder, an element disposed over the buttons and on which the shoe slides, and stops with which the shoe engages alternately at the ends of its strokes for elevating the feeder at the end of its discharge stroke and for causing the feeder to descend into engagement with the next button at the end of the return stroke.

7. A button feeding mechanism comprising means down which a plurality of buttons can flow, a reciprocatory feeder arranged to engage and discharge the lowermost button, an actuating lever to which the feeder is connected, a spring acting between the lever and feeder for effecting the return stroke of the feeder and urging the same toward the buttons, a shoe disposed under the feeder, links connecting the shoe with the feeder, an element disposed over the button and on which the shoe slides, and stops with which the shoe engages alternately at the ends of its strokes for elevating the feeder at the end of its discharge stroke and for causing the feeder to descend into engagement with the next button at the end of the return stroke, in combination with a reciprocatory part for operating the lever to move the feeder forwardly.

8. A button feeding mechanism comprising a chute down which buttons flow, a guard bar for holding the buttons in the chute, a reciprocatory feeder adapted to engage the lowermost button in the chute to eject the same, an actuating lever, a pivotal connection between the feeder and lever, a spring at the pivotal connection tending to draw the lever and feeder together, a shoe movably mounted on the feeder and slidable on the guard bar, and means for automatically shifting the position of the shoe to maintain the feeder elevated during its return stroke and for permitting the feeder to be in lowered position during the succeeding feeding stroke.

9. The combination in a button attaching mechanism, of a button feeding chute mounted for movement to and from normal position; a button feeder carried by the chute, an actuating lever for the feeder, a movable part arranged to engage the lever and move the same in one direction, spring means for moving the lever in the opposite direction, and a catch device for holding the lever in a position to be properly engaged by the said movable part when the chute is being returned to its normal position.

10. The combination in a button attaching mechanism, of a button feeding chute mounted for movement to and from normal position; a button feeder carried by the chute, an actuating lever for the feeder, a movable part arranged to engage the lever and move the same in one direction, spring means for moving the lever in the opposite direction, a catch device for holding the lever in a position to be properly engaged by the said movable part when the chute is being returned to its normal position, and a cam for releasing the catch device from the lever when the chute has reached its normal position.

11. A machine of the class described comprising a frame, a button feeding chute movably mounted on the frame, a spring-pressed lock bolt for holding the chute in normal position, and a cam on the frame engageable by the bolt when the chute is returned to its normal position for permitting the bolt to automatically lock the chute.

12. A button feeding mechanism comprising a chute, a hopper at the top thereof, a pick-up device in the hopper, means for moving the pick-up device from the bottom to the top of the hopper for picking up buttons and discharging them to the chute, said pick-up device including a plurality of pockets into which the shanks of buttons are adapted to extend, and means in the pockets for automatically alining the shanks of the buttons so as to pass into the chute.

13. A button feeding mechanism comprising a chute, a hopper, a vertically reciprocatory pick-up device in the hopper for supplying buttons to the chute, said pick-up device having in its top edge a groove for receiving the shanks of buttons, a plurality of pockets opening into the groove, whereby the shanks of buttons can enter the pockets, and means for moving the buttons out of the pockets into the groove.

14. A button feeding mechanism comprising a chute, a hopper, a vertically reciprocatory pick-up device in the hopper for supplying buttons to the chute, said pick-up device having in its top edge a groove for receiving the shanks of buttons, a plurality of pockets opening into the groove, whereby the shanks of buttons can enter the pockets, means for moving the buttons out of the pockets into the groove, and means for rolling the buttons to aline all of the shanks in the groove.

15. A button feeding mechanism comprising a chute, a hopper, a vertically reciprocatory pick-up device in the hopper for supplying buttons to the chute, said pick-up device having in its top edge a groove for receiving the shanks of buttons, a plurality of pockets opening into the groove, whereby the shanks of buttons can enter the pockets, means for moving the buttons out of the pockets into the groove, and an element movable longitudinally of the groove for imparting a turning motion to the buttons, whereby the shanks thereof are alined.

In testimony whereof I have signed my name to this specification in the presence of two subscribing witnesses.

BENJAMIN KOTKOVSKY.

Witnesses:
J. H. DULIN,
C. BRODWAY.